United States Patent
Keller et al.

(10) Patent No.: US 10,183,525 B2
(45) Date of Patent: Jan. 22, 2019

(54) ARRANGEMENT FOR FASTENING A WHEEL DISC MADE OF FIBER COMPOSITE MATERIAL TO A WHEEL HUB

(71) Applicant: Bayerische Motoren Werke Aktiengesellschaft, Munich (DE)

(72) Inventors: David Keller, Munich (DE); Peter Jaegermeyr, Wang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/870,987

(22) Filed: Sep. 30, 2015

(65) Prior Publication Data

US 2016/0016427 A1 Jan. 21, 2016

Related U.S. Application Data

(63) Continuation of application No. PCT/EP2014/054152, filed on Mar. 4, 2014.

(30) Foreign Application Priority Data

Apr. 2, 2013 (DE) .................. 10 2013 205 797

(51) Int. Cl.
- *B60B 3/14* (2006.01)
- *B60B 3/16* (2006.01)
- *B60B 5/02* (2006.01)

(52) U.S. Cl.
CPC .............. *B60B 3/145* (2013.01); *B60B 3/14* (2013.01); *B60B 3/16* (2013.01); *B60B 5/02* (2013.01);
(Continued)

(58) Field of Classification Search
CPC .. B60B 3/14; B60B 3/145; B60B 3/16; B60B 3/147
(Continued)

(56) References Cited

U.S. PATENT DOCUMENTS 4,900,097 A * 2/1990 Kostov ................. B60B 5/02
301/35.626
5,015,104 A * 5/1991 Sato ................. B41J 19/00
384/218
(Continued)

FOREIGN PATENT DOCUMENTS

DE 30 47 837 A1 10/1981
DE 100 06 400 A1 8/2001
(Continued)

OTHER PUBLICATIONS

International Search Report (PCT/ISA/210) issued in PCT Application No. PCT/EP2014/054152 dated May 28, 2014 with English translation (11 pages).
(Continued)

*Primary Examiner* — S. Joseph Morano
*Assistant Examiner* — Scott A Browne
(74) *Attorney, Agent, or Firm* — Crowell & Moring LLP

(57) ABSTRACT

A wheel for a motor vehicle, has a rim intended to receive a tire and a wheel disc made of fiber composite material joined to the rim, as well as an arrangement including screws or nuts for fastening the wheel disc to a wheel hub, for which purpose the wheel disc has axially directed openings for the passage of the screws or threaded bolts for screwing onto the nuts. The arrangement includes, for each opening of the wheel disc, an insulating body, a bush and a washer, each having a central opening, which surround the opening of the wheel disc in a U-shape, wherein the bush rests as a frame at an inner circumference of the opening, and the insulating body and the washer, resting against the frame and against the wheel disc in each case on one side of the wheel, at least partially cover the wheel disc in the radial direction. The insulating body is directed towards the wheel inside and the
(Continued)

washer is directed towards the wheel outside. The insulating body can consist at least partially of ceramic material.

12 Claims, 4 Drawing Sheets

(52) U.S. Cl.
CPC ..... *B60B 2310/305* (2013.01); *B60B 2360/10* (2013.01); *B60B 2360/34* (2013.01); *B60B 2360/341* (2013.01); *B60B 2360/70* (2013.01); *B60B 2900/111* (2013.01); *B60B 2900/141* (2013.01); *B60B 2900/325* (2013.01); *B60B 2900/513* (2013.01); *B60Y 2200/10* (2013.01); *Y02T 10/86* (2013.01)

(58) Field of Classification Search
USPC .......................... 301/35.626, 35.632
See application file for complete search history.

(56) References Cited

U.S. PATENT DOCUMENTS

| | | | | |
|---|---|---|---|---|
| 5,056,870 A | * | 10/1991 | Plumer | B60B 3/16 301/35.632 |
| 5,277,479 A | * | 1/1994 | Koyama | B60B 5/02 301/6.91 |
| 5,538,114 A | | 7/1996 | White et al. | |
| 5,542,753 A | * | 8/1996 | Plumer | F16B 43/00 301/35.632 |
| 6,296,319 B1 | * | 10/2001 | Hummel | B60B 1/06 301/35.621 |
| 7,290,838 B2 | * | 11/2007 | Handa | B60B 3/008 29/894.322 |
| 2003/0146656 A1 | * | 8/2003 | Teague | B60B 3/16 301/35.621 |
| 2008/0309151 A1 | * | 12/2008 | Kleber | B60B 3/16 301/37.31 |
| 2012/0007416 A1 | * | 1/2012 | Kazmierzak | B60B 3/02 301/112 |
| 2014/0175863 A1 | * | 6/2014 | Dingle | F16B 43/00 301/111.03 |

FOREIGN PATENT DOCUMENTS

| | | | | |
|---|---|---|---|---|
| EP | 0 282 008 A2 | | 9/1988 | |
| EP | 0 529 492 A1 | | 3/1993 | |
| EP | 1 249 355 A1 | | 10/2002 | |
| EP | 1249355 A1 | * | 10/2002 | ............... B60B 5/02 |
| GB | 2 069 422 A | | 8/1981 | |
| GB | 2 102 744 A | | 2/1983 | |
| JP | 62-95901 U | | 6/1987 | |
| JP | 2-128958 A | | 5/1990 | |
| JP | 7-228101 A | | 8/1995 | |
| JP | 07228101 A | * | 8/1995 | ............... B60B 3/14 |
| JP | 2002-293104 A | | 10/2002 | |
| JP | 2003-148526 A | | 5/2003 | |
| WO | WO 02/20252 A1 | | 3/2002 | |
| WO | WO 2013/000009 A1 | | 1/2013 | |
| WO | WO 2013/026880 A1 | | 2/2013 | |
| WO | WO 2013/030106 A1 | | 3/2013 | |
| WO | WO 2013/083729 A2 | | 6/2013 | |

OTHER PUBLICATIONS

German Search Report issued in counterpart German Application No. 10 2013 205 797.0 dated Oct. 25, 2013 with partial English translation (10 pages).

* cited by examiner

ARRANGEMENT FOR FASTENING A WHEEL DISC MADE OF FIBER COMPOSITE MATERIAL TO A WHEEL HUB

CROSS REFERENCE TO RELATED APPLICATIONS

This application is a continuation of PCT International Application No. PCT/EP2014/054152, filed Mar. 4, 2014, which claims priority under 35 U.S.C. § 119 from German Patent Application No. 10 2013 205 797.0, filed Apr. 2, 2013, the entire disclosures of which are herein expressly incorporated by reference.

BACKGROUND AND SUMMARY OF THE INVENTION

The invention relates to a wheel for vehicles, in particular motor vehicles, having an arrangement including screws or nuts having the purpose of fastening a wheel disc made of fiber composite material to a vehicle hub.

A wheel for motor vehicles has, according to the prior art, a wheel disk made of metal, in particular steel or aluminum, which is embodied as a pressed or cast part. The wheel also includes an arrangement for fastening the wheel disk to the vehicle axle, wherein this arrangement is generally composed of screws which engage in corresponding threaded holes on the vehicle axle. However, it is also known to arrange stay bolts on the vehicle axle and to fasten the wheel disk by way of nuts. Four or five screws or nuts which are distributed over the circumference are customary. Such wheels can have, in addition to the wheel disk and the arrangement for fastening it, also further elements, for example wheel caps, cover plates or the like. The wheel disk which is composed of metal has sufficient strength and stability. The wheel brake is usually provided adjacent to the wheel disk and can be embodied as a disk brake or drum brake and is fastened to the axle housing of the vehicle axle or to a part of the axle suspension.

It is known that when the brake is activated frictional heat is generated which heats not only the elements of the wheel brake but is also transmitted to other adjacent parts. The heat which is output to the wheel disk does not adversely affect the strength and stability of the wheel disk, especially since a certain degree of cooling of the elements of the wheel brake and of the wheel disk also takes place during driving. This cooling can be made more difficult if the wheel disk is subjected to the effects of dynamic wind only to a certain extent since a wheel cap made of plastic or the like is used. Also, owing to the cramped installation conditions in the field of modern motor vehicles, the cooling of elements of the wheel brake is comparatively poor. Since the wheels are some of the unsprung masses of a motor vehicle, efforts are made to reduce these masses by using specifically lightweight metals, in particular aluminum.

DE 30 47 837 A1 describes a vehicle wheel having a wheel disk made of synthetic plastic, in particular made of plastic which is reinforced with glass fibers. In this context, the wheel disk is assigned a washer made of steel which has projections or radial webs on its side facing the vehicle hub. The fastening device is composed of screws which both penetrate the wheel disk and the washer and engage in the vehicle hub. The wheel disk which is composed of plastic has a central opening, through which cooling air from the exterior of the wheel can be sucked in. The driving of the cooling air is carried out through radial webs in conjunction with the rotating wheel. The washer made of steel covers only part of the wheel disk which is composed of plastic.

The invention is based on the concept of using a wheel disk made of plastic. It is possible to use, in particular, a fiber-reinforced plastic. A material is then used whose specific weight differs considerably from that of metals. However, such a plastic has the disadvantage that it is a poor conductor of heat, that is to say, as it were, it constitutes an insulating body. Given a considerable input of heat, this adversely affects the strength of the wheel disk. The different thermal expansion of plastics, in particular of carbon-fiber-reinforced polymers and metallic substances in the wheel screwing arrangement, gives rise to intrinsic thermal stresses when heating occurs, for example as a result of the brake. The bearing face between the wheel base body and the friction cap/wheel driver is thus highly thermally stressed. The poor conduction of heat of many plastics can then result in accumulation of heat, which can have a negative effect on the material plastic. Furthermore, customary metallic inserts in the region of the screwing arrangement must be electrically isolated from a carbon-fiber-reinforced plastic in order to avoid contact corrosion.

The object of the invention is to remedy these disadvantages by providing a particular device for fastening a wheel disk made of plastic.

This and other objects are achieved according to the invention by a wheel for a vehicle, having a rim which is intended to receive a tire, and a wheel disk which is connected thereto and is made of fiber composite material. An arrangement, which has screws or nuts and has the purpose of fastening the wheel disk to a wheel hub is provided, for which purpose the wheel disk has axially directed openings for the passage of the screws or threaded bolts for screwing onto the nuts. The arrangement includes, for each opening of the wheel disk, an insulating body, a bushing and a washer, each with a central opening which surround the breakthrough in the wheel disk in a U shape. The bushing bears, as a frame, against the inner circumference of the opening, and the insulating body and the washer at least partially cover the wheel disk in the radial direction while bearing against the frame and against the wheel disk, in each case on one side of the wheel, with the insulating body directed toward the inside of the wheel, and the washer directed toward the outside of the wheel. In this context, the insulating body can be composed at least partially of ceramic material.

If positively locking, frictionally locking or materially joined insulating bodies or ceramic inserts are introduced in the region of a wheel screwing arrangement in this way, this has the advantage that the ceramic material thermally insulates and, as a result, protects the plastic of the wheel disk against damage by high temperatures. Ceramic is also non-critical with respect to settling and creepage, even under temperature effects. As electrical insulators, ceramic inserts additionally avoid galvanic corrosion. For example $ZiO_2$ is appropriate as a ceramic material. The ceramic material is then selected such that it is a thermal and galvanic insulator.

Preferred embodiments of the invention provide that the bushing and the washer are composed of ceramic material or of metal. In this case, the bushing and washer can advantageously also be embodied in one piece. Alternatively, the bushing and the insulating body can be embodied in one piece. If the wheel disk and the bushing then form a conical seat with one another, and the insulating body and the bushing possibly also form a conical seat with one another, such a conical attachment face has the advantage that a centering effect for the wheel disk is provided by the fastening device. Conical centering and support faces also contribute to enlarging the contact faces. Direct contact between the screws or nuts of the screw fastening and the wheel disk made of plastic is also avoided by the fastening device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
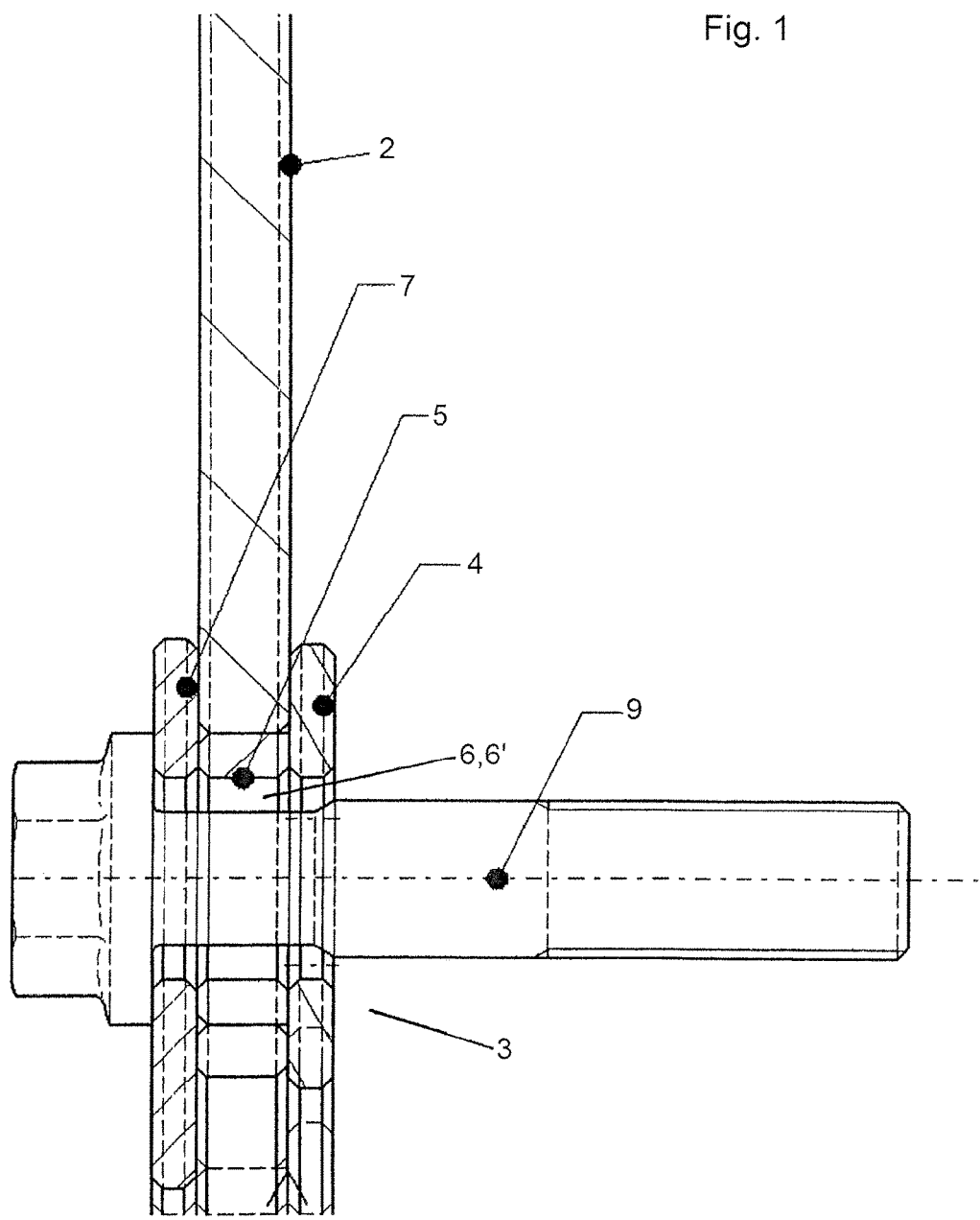
FIG. 1 is a partial cross-sectional view through a fastening device for a wheel disc on a vehicle axle of a motor vehicle according to a first exemplary embodiment of the invention.

A wheel which is illustrated only partially in the figures is composed essentially of three parts, specifically of a tire (not illustrated), fitted onto a rim (not illustrated) with which a wheel disk 2 made of fiber composite material is connected. The wheel disk 2 is connected to a vehicle hub (not illustrated) of a vehicle axle by way of an arrangement 3 for fastening the wheel disk 2. For this purpose, the wheel disk 2 usually has four or five axially directed openings 6, arranged distributed over the circumference, for wheel screws 9 to pass through (in each case, one opening 6 of which with a plugged-through wheel screw 9 is illustrated in the figures). Of course, the wheel disk 2 can be configured with a shape known per se, as is also the case with wheel disks made of steel or aluminum.

In each figure, just one wheel screw 9 of the arrangement 3 for fastening the wheel disk 2 to the vehicle hub is shown (arrangement 3 in each of FIGS. 1-4 is labeled 3, 3', 3", 3''', respectively). The overall fastening arrangement 3 has four or five intermediate elements, each of which is penetrated by a respective wheel screw 9, wherein each intermediate element comprises an insulating body 4, a bushing 5 and a washer 7, each with a central opening 6' for the wheel screw 9. Each intermediate element surrounds the opening 6 in the wheel disk 2 in a U-shape viewed in cross-section. In this context, the bushing 5 bears, as a frame, against the inner circumference of the breakthrough 6 of the wheel disk 2. The insulating body 4 and the washer 7 bear against the frame and against the wheel disk 2, in each case on one side of the wheel, and at least partially cover the wheel disk 2 in the radial direction. The insulating body 4 is directed toward the inside of the wheel, and the washer 7 is directed toward the outside of the wheel. The transmission of heat, in particular the heat produced during braking, to the wheel disk 2 is considerably reduced by the insulating body 4. The insulating body 4 is advantageously composed of ceramic material.

In this context, the bushing 5 and the washer 7 can be fabricated from ceramic material or from metal.

Figure 2:
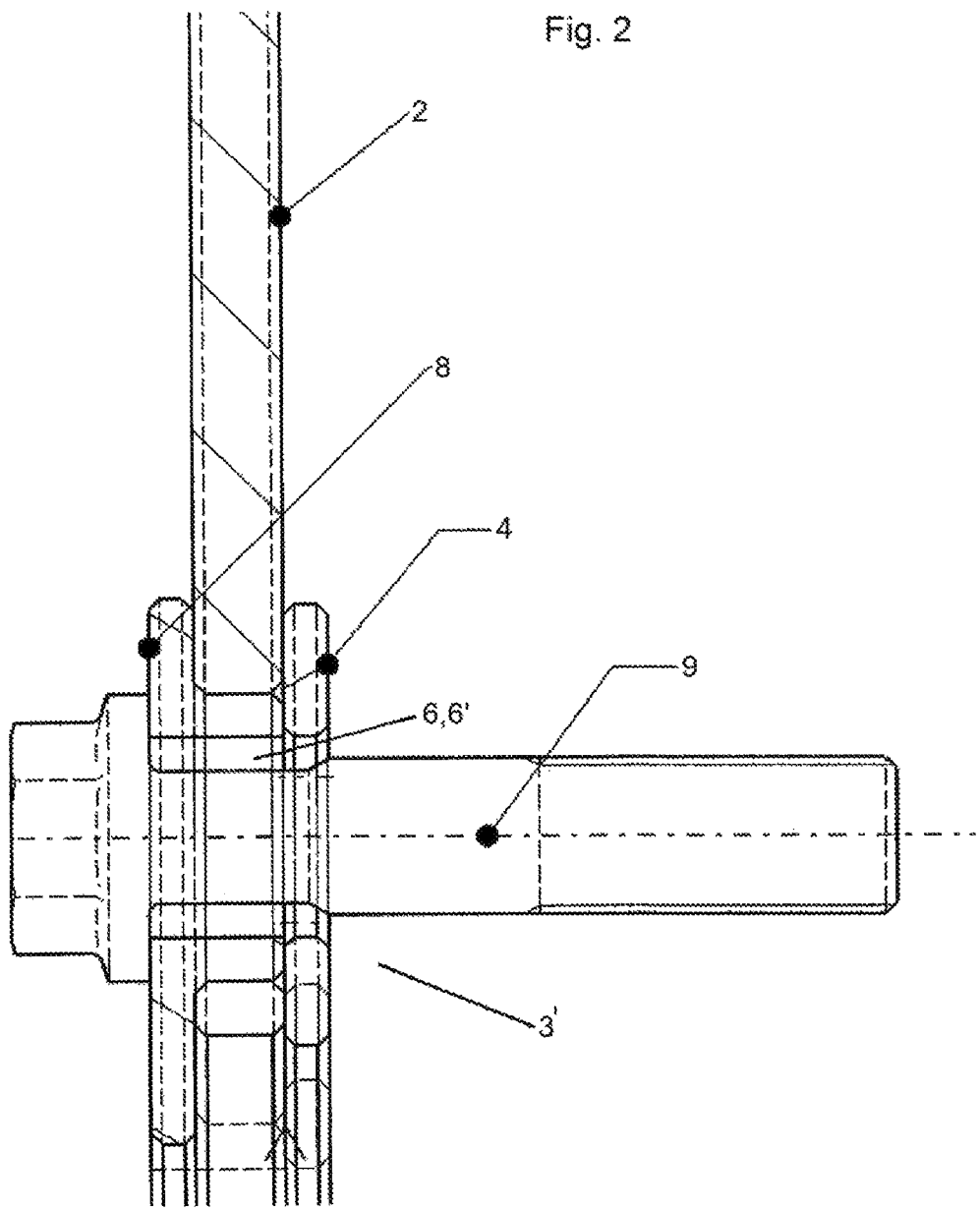
FIG. 2 is a partial cross-sectional view through a fastening device for a wheel disc on a vehicle axle of a motor vehicle according to a second exemplary embodiment of the invention.
Figure 3:
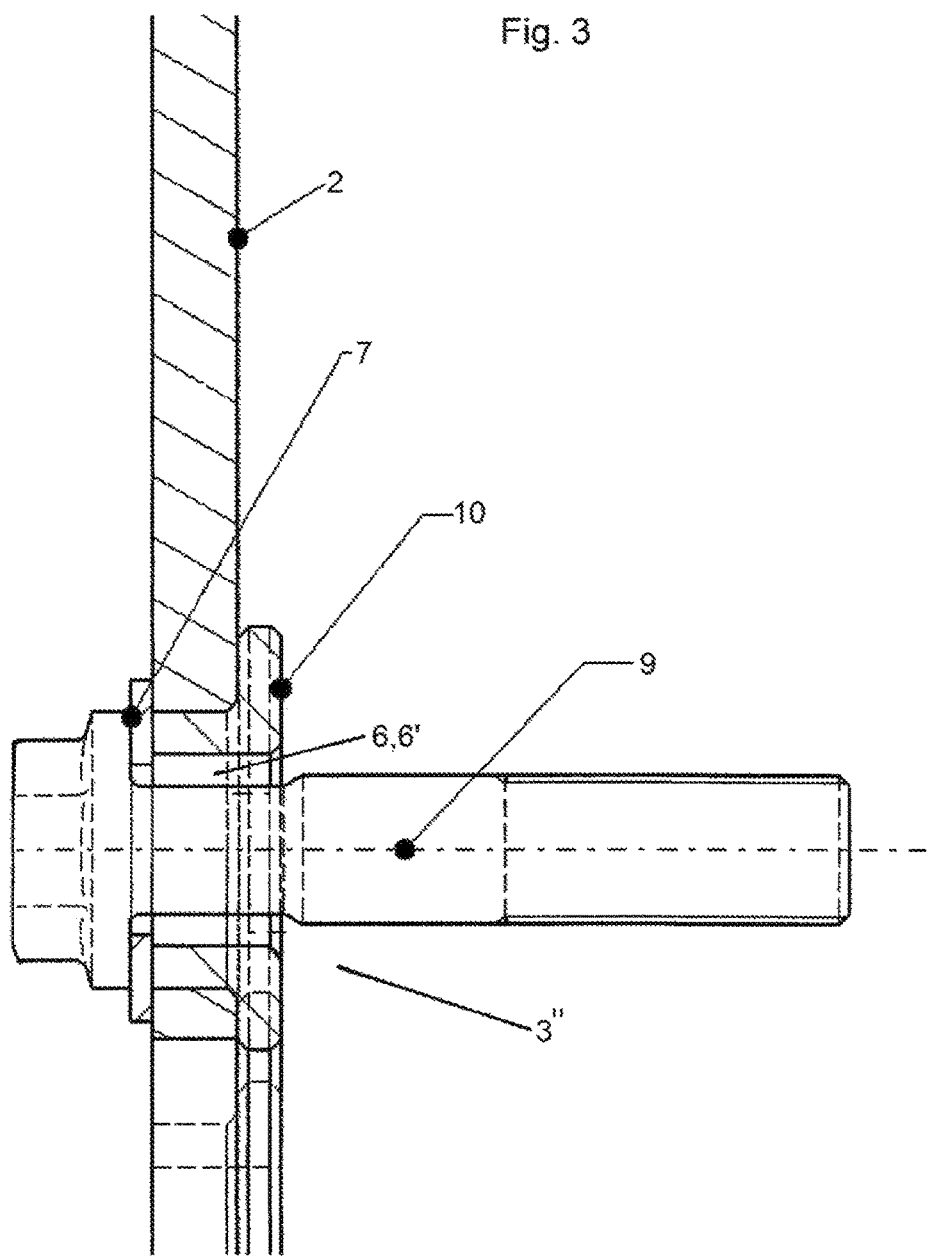
FIG. 3 is a partial cross-sectional view through a fastening device for a wheel disc on a vehicle axle of a motor vehicle according to a third exemplary embodiment of the invention.

In the embodiment of the invention according to FIG. 2, the bushing and the washer are embodied in one piece, as a collar bushing 8, while the embodiment of the invention according to FIG. 3 shows an insulating body bushing 10, in which the bushing and the insulating body are embodied in one piece.

Figure 4:
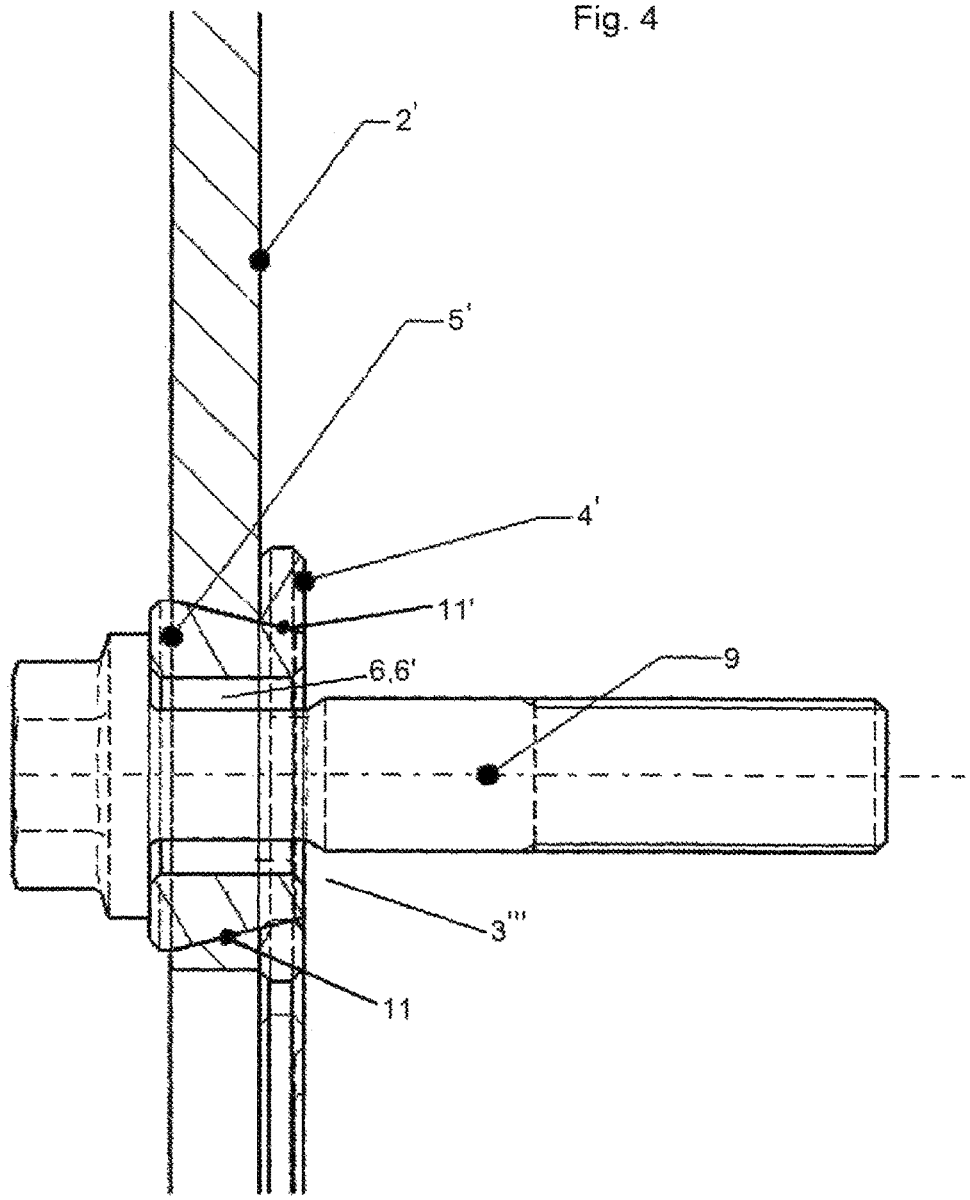
FIG. 4 is a partial cross-sectional view through a fastening device for a wheel disc on a vehicle axle of a motor vehicle according to a fourth exemplary embodiment of the invention.

FIG. 4 shows, in contrast, an embodiment of the invention in which the wheel disk 2' and the bushing 5' form a conical seat 11 with one another. In addition, the insulating body 4' and the bushing 5' also form a conical seat 11'. For this purpose, the outer circumference of the bushing 5' tapers conically toward the inside of the wheel, while the wheel disk 2' and the insulating body 4' have an inner circumference which is configured to taper correspondingly in a conical fashion toward the outside of the wheel. As a result, the wheel disk 2' is centered relative to the insulating body 4'. The conical seat 11 also has the effect that more torque can be transmitted from the wheel hub to the wheel disk 4'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel for a vehicle, comprising:
a rim on which a tire is mountable;
a wheel disc connected to the rim, the wheel disc being made of a fiber composite material;
an arrangement for fastening the wheel disc to a wheel hub, for which purpose the wheel disc has axially aligned openings for passage of screws or threaded bolts, wherein
for each of the axially aligned openings of the wheel disc, the arrangement comprises an insulating body, a bushing and a washer,
each of the insulating body, the bushing and the washer have a central opening,
the insulating body, the bushing, and the washer surround their respective one of the axially aligned openings of the wheel disc in a U-shape which extends, on both an inner side and an outer side of the wheel, axially beyond respective axially outermost face surfaces of the wheel disc at the axially aligned openings and radially beyond a radius of the axially aligned openings,
the bushing rests as a frame at an inner circumference of the opening,
the insulating body and the washer rest against the frame and against the wheel disc in each case on one side of the wheel at least partially covering the wheel disc in the radial direction, and
the insulating body is located at the inner side of the wheel and the washer is located at the outer side of the wheel.

2. The wheel according to claim 1, wherein the insulating body is composed at least partially of ceramic material.

3. The wheel according to claim 2, wherein the bushing and the washer are composed of ceramic material or metal.

4. The wheel according to claim 1, wherein the bushing and the washer are composed of ceramic material or metal.

5. The wheel according to claim 1, wherein the bushing and the washer are formed in one piece.

6. The wheel according to claim 3, wherein the bushing and the washer are formed in one piece.

7. The wheel according to claim 1, wherein the bushing and the insulating body are formed in one piece.

8. The wheel according to claim 2, wherein the bushing and the insulating body are formed in one piece.

9. The wheel according to claim 4, wherein the bushing and the insulating body are formed in one piece.

10. The wheel according to claim 1, wherein the wheel disc and the bushing form a conical seat with one another.

11. The wheel according to claim 10, wherein the insulating body and the bushing form a conical seat with one another.

12. The wheel according to claim 1, wherein the insulating body and the bushing form a conical seat with one another.

\* \* \* \* \*